United States Patent
Vajravel et al.

(10) Patent No.: US 11,196,817 B1
(45) Date of Patent: Dec. 7, 2021

(54) INTELLIGENTLY MANAGING RESOURCE UTILIZATION IN DESKTOP VIRTUALIZATION ENVIRONMENTS

(71) Applicant: Dell Products L.P., Round Rock, TX (US)

(72) Inventors: Gokul Thiruchengode Vajravel, Bangalore (IN); Vivek Viswanathan Iyer, Austin, TX (US); Ankit Kumar, Deoghar (IN); Ajay Baburam Yadav, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/891,226

(22) Filed: Jun. 3, 2020

(51) Int. Cl.
| | |
|---|---|
| G06F 15/16 | (2006.01) |
| H04L 29/08 | (2006.01) |
| H04L 29/06 | (2006.01) |
| G06F 9/455 | (2018.01) |
| G06N 20/00 | (2019.01) |

(52) U.S. Cl.
CPC ........ H04L 67/141 (2013.01); G06F 9/45558 (2013.01); G06N 20/00 (2019.01); H04L 67/1008 (2013.01); H04L 67/42 (2013.01); G06F 2009/45595 (2013.01)

(58) Field of Classification Search
CPC ... H04L 67/141; H04L 67/1008; H04L 67/42; G06N 20/00; G06F 2009/45595
See application file for complete search history.

(56) References Cited

U.S. PATENT DOCUMENTS

| | | | |
|---|---|---|---|
| 8,117,314 B2* | 2/2012 | Croft | G06F 3/1415 709/227 |
| 8,406,155 B1* | 3/2013 | Vasquez | H04L 41/5064 370/259 |
| 8,665,714 B2* | 3/2014 | Benveniste | H04W 28/02 370/230 |
| 2003/0182429 A1* | 9/2003 | Jagels | H04L 29/06027 709/227 |
| 2007/0043860 A1* | 2/2007 | Pabari | H04L 41/0886 709/224 |
| 2008/0047023 A1* | 2/2008 | Lam | G06F 21/74 726/30 |
| 2009/0147684 A1* | 6/2009 | Majidi-Ahy | H04L 12/66 370/236 |
| 2010/0191854 A1* | 7/2010 | Isci | G06F 1/3203 709/226 |
| 2012/0072985 A1* | 3/2012 | Davne | H04L 63/20 726/22 |
| 2013/0054684 A1* | 2/2013 | Brazier | H04M 3/5231 709/203 |
| 2013/0151598 A1* | 6/2013 | Fu | G06F 9/452 709/203 |

(Continued)

*Primary Examiner* — Razu A Miah
(74) *Attorney, Agent, or Firm* — Kirton McConkie; Brian Tucker

(57) ABSTRACT

Resource utilization can be intelligently managed in desktop virtualization environments. Utilization of client and server resources can be tracked during sessions that are established to access desktops. Machine learning models can be applied to the client and server resource utilization to create policies that define configuration settings for dynamically optimizing sessions based on the current utilization of resources during the sessions.

19 Claims, 4 Drawing Sheets

(56) References Cited

U.S. PATENT DOCUMENTS

| | | | |
|---|---|---|---|
| 2013/0159374 A1* | 6/2013 | Steiner | H04L 51/16 709/201 |
| 2014/0016650 A1* | 1/2014 | Chai | H04L 45/02 370/431 |
| 2014/0032775 A1* | 1/2014 | Abiezzi | H04N 19/70 709/231 |
| 2014/0115028 A1* | 4/2014 | Taylor | H04L 67/141 709/202 |
| 2014/0122730 A1* | 5/2014 | Burch | H04L 63/0807 709/228 |
| 2014/0344332 A1* | 11/2014 | Giebler | H04L 67/42 709/203 |
| 2015/0095446 A1* | 4/2015 | Ramasubramanian | H04L 67/1008 709/214 |
| 2015/0237117 A1* | 8/2015 | Taylor | H04L 67/42 709/229 |
| 2015/0373148 A1* | 12/2015 | He | H04L 67/16 709/203 |
| 2016/0099948 A1* | 4/2016 | Ott | H04L 63/0281 726/1 |
| 2016/0100015 A1* | 4/2016 | Levy | H04L 67/141 709/227 |
| 2016/0219126 A1* | 7/2016 | Oh | G06F 3/1431 |
| 2016/0381000 A1* | 12/2016 | Mathew | G06F 21/41 726/4 |
| 2017/0118218 A1* | 4/2017 | Koottayi | H04L 63/101 |

* cited by examiner

| Client Resource Information | | | | Server Resource Information | | Configuration Settings | | | | |
|---|---|---|---|---|---|---|---|---|---|---|
| Client CPU % | Client Engine State | AC/DC Mode | User Presence | Server CPU % | Phys. Mach. CPU % | HTML5 Media Offload | H264 Media Redirection | RTAV/ RTME | Stream Resolution Throttle % | |
| 50% | Fullscreen | AC | Near-Field | 40% | 75% | No | Yes | Yes | 0% | Policy 222 |
| 90% | Foreground | DC | Near-Field | 30% | 60% | No | No | No | 30% | |
| ⋮ | ⋮ | ⋮ | ⋮ | ⋮ | ⋮ | ⋮ | ⋮ | ⋮ | ⋮ | |

Sets of resource utilization information / Sets of Configuration Settings

FIG. 3

INTELLIGENTLY MANAGING RESOURCE UTILIZATION IN DESKTOP VIRTUALIZATION ENVIRONMENTS

CROSS-REFERENCE TO RELATED APPLICATIONS

N/A

BACKGROUND

Desktop virtualization refers to various techniques for hosting a desktop on a server while enabling a client to access the desktop over a network using a remote display protocol. FIG. 1 provides a general example of a desktop virtualization environment 100 that includes a number of clients 102-1 through 102-n (referenced generally herein as client(s) 102) in communication with a server 104 via a network 106. Server 104 may be configured to employ various techniques to host multiple desktops simultaneously. Clients 102 can remotely access these desktops using any of several remote display protocols such as the Remote Desktop Protocol (RDP), the Citrix® Independent Computing Architecture (ICA), the PC over IP (PCoIP) Protocol, etc.

Client 102 may represent any computing device capable of implementing a remote display protocol to access a desktop hosted on server 104 including a desktop computer, a laptop, a thin client, a smart phone, a kiosk, etc. Server 104 may be provided on a physical computing device, in a cloud or in any other suitable manner.

Using the remote display protocol, server 104 sends display data of the desktop to client 102 over network 106 (e.g., a LAN or the internet) to thereby allow client 102 to locally display the desktop. Client 102 may also use the remote display protocol to send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop changes in response to the user commands, server 104 sends the updated display data to client 102. Client 102 locally displays the updated display data so that the user at client 102 can view changes in the desktop in response to the user commands. In this way, the user at client 102 can locally view and input commands to the desktop that is running remotely on server 104. These same techniques can be employed to cause the user interface of a single application running on server 104, as opposed to the entire desktop, to be displayed locally on client 102 (i.e., application virtualization).

In some use cases, server 104 may host multiple virtual machines (VMs) or other containers for executing multiple desktops simultaneously. In other user cases, server 104 may run an operating system that allows different desktops to be accessed simultaneously. In any case, each of the desktops will consume resources of server 104. It is typically desirable to maximize the number of desktops that server 104 can host (e.g., the minimize the number of servers 104 an entity must purchase or maintain to implement desktop virtualization). This can be accomplished by offloading some tasks to clients 102. For example, server 104 may be configured to perform multimedia redirection to cause multimedia content that is accessed within the desktop to be rendered on client 102 rather than on server 104.

If tasks are not offloaded properly, resource utilization on server 104 may become excessive and limit the number of VMs that can be hosted. On the other hand, when tasks are offloaded to clients 102, resource utilization on clients 102 may become excessive and degrade the user experience. For example, if multimedia redirection is performed when client 102 is running on battery, the rendering of the multimedia content may quickly drain the battery. Alternatively, while running on battery, client 102 may employ a power saver mode which may result in a jittery display of the multimedia content or other display data. Furthermore, with the various types and capabilities of clients 102, what may be an appropriate level of offloading for one client may be excessive for another. As such, there are many different factors and considerations for balancing the load between server 104 and clients 102. In short, proper load balancing in a desktop virtualization environment not only requires initial capacity planning and configuration, but is an ongoing endeavor that oftentimes requires assistance from the desktop virtualization provider.

BRIEF SUMMARY

The present invention extends to methods, systems, and computer program products for intelligently managing resource utilization in desktop virtualization environments. Utilization of client and server resources can be tracked during sessions that are established to access desktops. Machine learning models can be applied to the client and server resource utilization to create policies that define configuration settings for dynamically optimizing sessions based on the current utilization of resources during the sessions.

In some embodiments, the present invention may be implemented as a method for intelligently managing resource utilization in a desktop virtualization environment. While a client has established a session with a server to access a desktop hosted on the server, client resource information defining utilization of resources on the client during the session and server resource information defining utilization of resources on the server during the session can be obtained. The client resource information and the server resource information can be evaluated against a policy applicable to the session. Based on the evaluation, a first set of configuration settings for optimizing the session can be identified. The first set of configuration settings can then be applied on the client and the server to optimize the session.

In some embodiments, the present invention may be implemented as computer storage media storing computer executable instructions which when executed in a desktop virtualization environment implement a method for optimizing a session between a client and a server for accessing a desktop on the server. Client resource information and server resource information can be obtained during the session. A policy can then be accessed to determine that the client resource information and the server resource information matches a first set of resource utilization information defined in the policy. A first set of configuration settings that are mapped to the first set of resource utilization information can be identified. The first set of configuration settings can then be applied on the client and the server to optimize the session.

In some embodiments, the present invention may be implemented as method for intelligently managing resource utilization in a desktop virtualization environment. While a first client has established a first session with a server to access a desktop hosted on the server, first client resource information defining utilization of resources on the first client during the session and first server resource information defining utilization of resources on the server during the first session can be obtained. A policy can be accessed to determine that the first client resource information and the first server resource information matches a first set of resource utilization information defined in the policy. A first set of configuration settings that are mapped to the first set of resource utilization information can be identified. The first set of configuration settings can be applied on the first client and the server to optimize the first session. While a second client has established a second session with the server to access a desktop hosted on the server, second client resource information defining utilization of resources on the second client during the second session and second server resource information defining utilization of resources on the server during the second session can be obtained. The policy can then be accessed to determine that the second client resource information and the second server resource information matches a second set of resource utilization information defined in the policy. A second set of configuration settings that are mapped to the second set of resource utilization information can be identified. The second set of configuration settings are then applied on the second client and the server to optimize the second session.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 3 provides an example of a policy that can be created and employed when embodiments of the present invention are implemented.

DETAILED DESCRIPTION

In this specification, the term "desktop virtualization" is used as a general term and is intended to encompass the various different techniques that can be implemented to enable a client to access a desktop that is hosted on a server. Desktop virtualization therefore includes, but is not limited to, virtual desktop infrastructure (VDI), Remote Desktop Session Host (RDSH) and Desktop-as-a-Service (DaaS). Also, desktop virtualization should encompass the various different ways in which a desktop may be hosted on the server including, but not limited to, in a VM, as a session of the server's OS and in a container. Further, the term "desktop" in the context of what is provided on the client shall include an application. In other words, embodiments of the present invention can be implemented whenever a client employs a remote display protocol to access a desktop or application that is hosted in any manner on a server. The term "session" will be used to represent the interactions between client 102 and server 104 which allow client 102 to access a desktop hosted on server 104. For example, client 102 may establish a session with server 104 using a remote display protocol resulting in client 102 being granted access to a desktop while the session is maintained.

Figure 1:
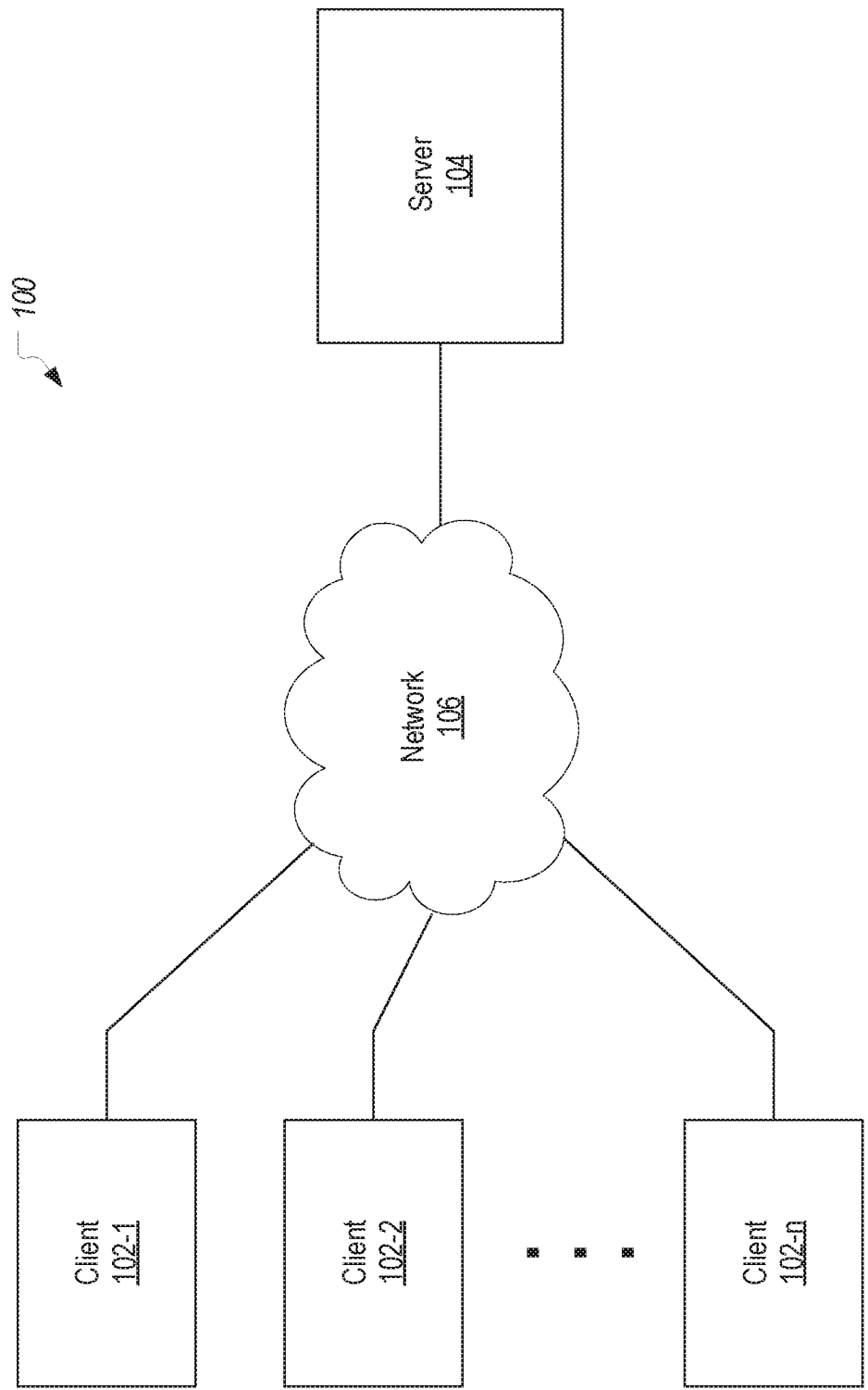
FIG. 1 illustrates an example desktop virtualization environment in which the present invention can be implemented.
Figure 2:
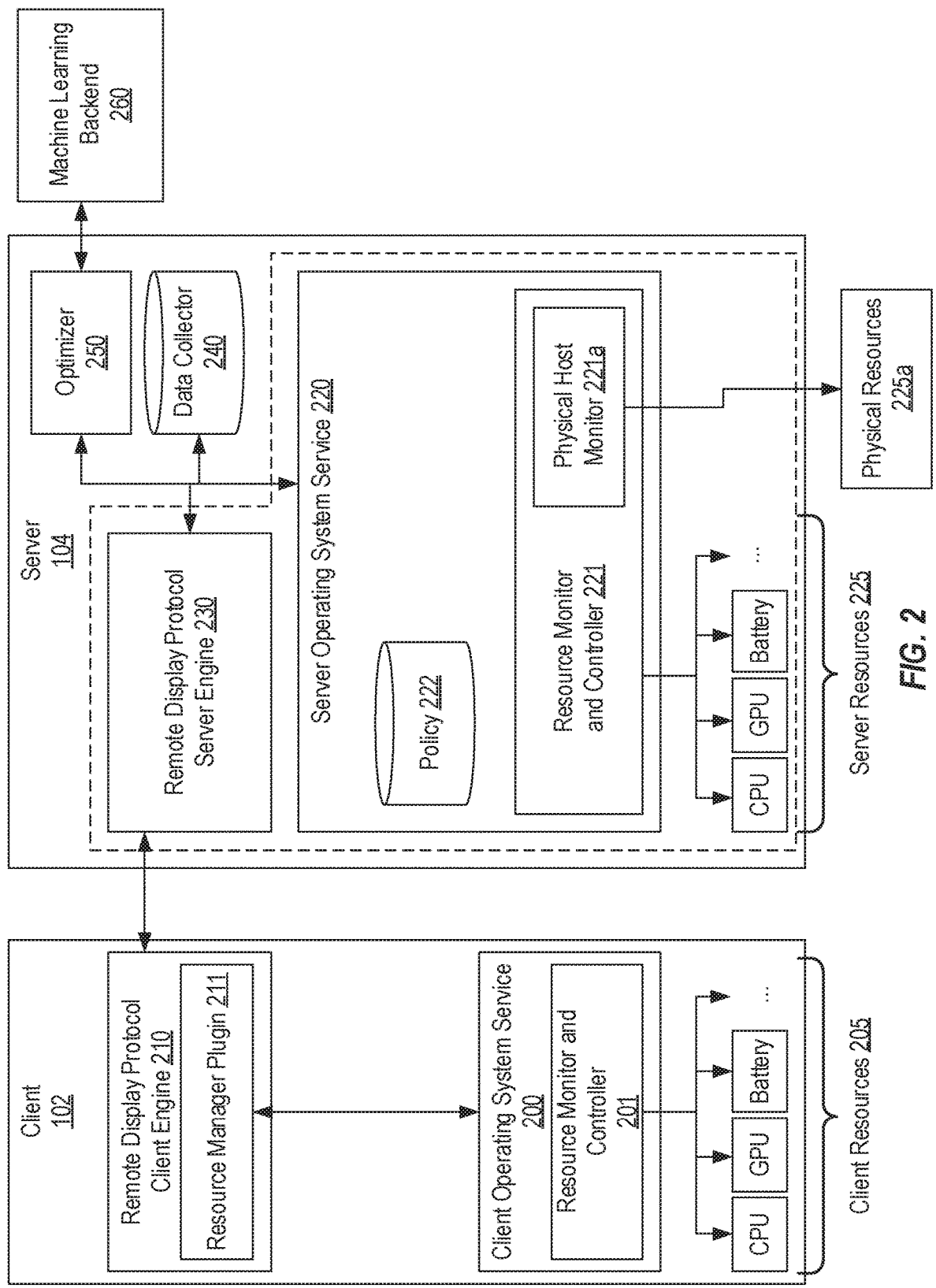
FIG. 2 provides an example of components that may be employed on a client and on a server to implement embodiments of the present invention.

FIG. 2 provides an example of various components that may be employed on client 102 and server 104 when embodiments of the present invention are implemented. FIG. 2 represents a scenario where VDI desktop virtualization is employed and therefore server 104 launches a VM to enable access to a desktop. This VM is represented in dashed lines, and there would typically be many VMs on server 104. However, the present invention should not be limited to the architecture shown in FIG. 2. For example, in an RDSH embodiment, some of the depicted components may run in the context of a particular session, while others may run in a local session. Likewise, in a container (e.g., Docker) environment, some of the depicted components may run in the container, while others may run on the underlying operating system. Therefore, in the following description, the server-side components may be described generally as being executed on server 104.

Client 102 can execute a remote display protocol client engine 210 (or simply "client engine 210") that includes a resource manager plugin 211. A remote display protocol server engine 230 (or simply "server engine 230") may be executed on server 104 (e.g., in each VM that server 104 executes). Client engine 210 and server engine 230 can represent any of the client-side and server-side components of the various desktop virtualization solutions that implement a remote display protocol to allow a desktop hosted on server 104 to be accessed on client 102. In some embodiments, resource manager plugin 211 may be in the form of a virtual channel plugin, but it could be in any other suitable form that enables the respective functionality described herein to be performed.

Client 102 can also execute a client operating system service 200 having a resource monitor and controller 201 that is generally configured to monitor and control various client resources 205. For example, client 102 may typically include a CPU, a GPU, a battery and possibly many other resources. Resource monitor and controller 201 can use any available technique to monitor client resources 205 while client 102 is accessing a desktop hosted on server 104 including, for example, identifying a current load on or consumption of the CPU, the GPU, a disk or other storage device, a network interface, the battery or other power source, identifying whether client 102 is running on DC or AC power, identifying a power scheme that client 102 is currently implementing (e.g., a high performance power scheme versus a battery saver power scheme), identifying a presence of a user of client 102 (e.g., using a proximity sensor), identifying a context of the desktop (e.g., whether the window in which the desktop is displayed is in the foreground or minimized, whether the window is full screen or another size, etc.), etc. (collectively referred to as "client resource information").

Client operating system service 200 can relay this client resource information via resource manager plugin 211 to a server operating system service 220 executing on server 104 (e.g., to the instance of server operating system service 220 executing on the VM in which the desktop is hosted). Because resource manager plugin 211 is part of client engine 210, it can also relay the status of the session to server 104 (e.g., whether/when the session is connected, suspended, disconnected, etc.). Accordingly, while remote display protocol client engine 210 has established a session with remote display protocol server engine 230, server operating system service 220 can receive client resource information representing the utilization of client resources 205 during the session and can also be notified of changes in the status of the session.

Server operating system service 220 also includes a resource monitor and controller 221 that is generally configured to monitor and control server resources 225. In FIG. 2, server resources 225 represent virtualized resources (e.g., the virtualized resources made available to the VM). However, FIG. 2 also depicts that resource monitor and controller 221 may include a physical host monitor 221*a* that is generally configured to monitor (and possibly control) physical resources 225*a* (e.g., the hardware of a physical server on which a VM having virtualized server resources 225 is run). Given the variety of server-side configurations that may be employed to implement desktop virtualization, references to "server resources" may therefore be construed as encompassing only server resources 225, both server resources 225 and physical resources 225*a* or only physical resources 225*a*.

Similar to resource monitor and controller 201, resource monitor and controller 221, including in some embodiments physical host monitor 221*a*, can use any available technique to monitor server resources 225/physical resources 225*a* such as, for example, identifying a current load on or consumption of the CPU, the GPU, a disk or other storage device, a network interface, etc. (collectively referred to as "server resource information"). Accordingly, while client engine 210 has established a session with server engine 230 for the purpose of accessing a desktop hosted on server 104, server operating system service 220 can receive (e.g., as an endpoint of a virtual channel) the client resource information from client operating system service 200 which represents utilization of client resources 205 during the session and also compile server resource information which represents utilization of server resources 225 and/or physical resources 225*a* during the session.

In some embodiments, server operating system service 220 may store this client and server resource information in data collector 240 which may represent a database or any other structured data store. Server 104 may include an optimizer 250 that interfaces with data collector 240 to obtain the client and server resource information stored therein. This client and server resource information could pertain to sessions established by a variety of users using a variety of clients 102, by a variety of users using a single client 102, by a single user using a variety of clients 102, by a single user using a single client 102, etc. Optimizer 250 can be configured to apply a machine learning model to the client and server resource information stored in data collector 240 (e.g., by interfacing with a machine learning backend 260 or by integrating a machine learning solution on server 104) to create policies that can then be employed during sessions to manage utilization of client resources 205 and server resources 225. For example, server operating system service 220 is shown as maintaining a policy 222 that applies to the current session between client 102 and server 104. As described in greater detail below, a policy can define one or more mappings between a set of resource utilization information and a set of configuration settings where the set of configuration settings are intended to optimize a session when the session's resource utilization matches the set of resource utilization information. In other words, in embodiments of the present invention, a set of configuration settings can be selected based on the current resource utilization.

Although data collector 240 and optimizer 250 are shown in FIG. 2 as being part of server 104, these components can equally be hosted on any other server or computing device. Notably, it is not necessary to apply the machine learning model to the client and server resource information collected during each session that a client 102 may establish with server 104, and a policy may be established based on historical information alone. However, in some embodiments, server operating system service 220 can provide the client and server resource information for every session that a client 102 may establish to thereby allow optimizer 250 to continuously refine an applicable policy.

As one example, in some embodiments, optimizer 250 may create a policy that is specific to a particular user. For example, server operating system service 220 can be configured to associate a user identifier with the client and server resource information that is obtained during the corresponding user's sessions. Then, optimizer 250 can apply the machine learning model to the user-specific client and server resource information that is generated over time to create a policy based on the user-specific client and server resource information. In such cases, the user-specific policy could be stored in association with the user's account (e.g., as part of the user's profile in Active Directory or another directory service that is leveraged when a user establishes sessions) so that it can be loaded as part of server operating system service 220 whenever the user establishes a session. Accordingly, regardless of which client 102 the user may employ to access a desktop on server 104 (e.g., a laptop vs. a thin client or mobile device with limited resources), the user-specific policy can be applied to dynamically control resource utilization during the session to thereby ensure that the user receives a consistent experience.

As another example, in other embodiments, optimizer 250 may create a policy that is specific to server 104 as opposed to being user specific. For example, in an RDSH scenario, the same operating system on server 104 will provide multiple sessions for simultaneously hosting the desktops that multiple users may access. In such cases, server resources 225, including physical resources 225*a*, may be the primary limiting factor in providing an optimal user experience for all sessions. Therefore, a policy can be generated using the client and resource utilization information generated during many users' sessions where the policy can identify configuration settings applicable to all concurrent sessions to ensure that the utilization of all client and server resources adhere to the policy.

As another example, in other embodiments, optimizer 250 may create a policy that is specific to a particular workload and possibly the user. For example, client 102 could be routinely employed to access a desktop on server 104 to perform the same workload. In such cases, server operating system service 220 could gather the client and server resource information that would be generated during the performance of the workload to thereby enable optimizer 250 to create a policy that defines configuration settings that when applied will optimize the utilization of client resources 205 and server resources 225 for that workload.

In some embodiments, multiple policies may apply to a given session. For example, policy 222 could represent both a user-specific policy and a policy applicable to server 104. Accordingly, a wide variety of policies could be created and employed in embodiments of the present invention.

Regardless of how policy 222 may be created, server operating system service 220 and client operating system service 200 can implement policy 222 during a session between client 102 and server 104. For example, in some embodiments, while client engine 210 and server engine 230 have established a session, server operating system service 220 can receive client resource information from client operating system service 200, generate server resource information and evaluate the client and server resource information against policy 222. Based on the comparison, server operating system service 220 in conjunction with client operating system service 200 may adjust the session's configuration settings which in turn should adjust the utilization of client and server resources to optimize the user experience.

FIG. 3 provides one simplified example of how policy 222 may be structured. As stated above, a policy can define one or more mappings between a set of resource utilization information and a set of configuration settings for a session (or more particularly, mappings between values for the set of resource utilization information and values for the set of configuration settings). Each set of resource utilization information may include both client resource information and server resource information. For example, in FIG. 3, policy 222 is shown as including two mappings, both of which include a set of resource utilization information that encompasses four types of client resource information (client CPU %, the display state of client engine 210, whether client 102 is plugged in or running on battery and the presence of a user) and two types of server resource information (the server (or VM) CPU % and the physical machine CPU %). Each of these two mappings also include a set of four configuration settings (HTML5 media offloading, H264 media redirection, RTAV/RTME and stream resolution throttle percentage). As represented in FIG. 3, policy 222 could include other mappings which may or may not map the same set of resource utilization information to the same set of configuration settings. For example, policy 222, or another policy that may also be applicable to the same session as policy 222, could include a mapping between a different set of resource utilization information and the same or different set of configuration settings. In short, a policy can indicate which set of client resource information should be considered when determining whether the corresponding set of configuration settings should be applied during a session.

Using the first mapping shown in FIG. 3 as an example, if client operating system service 200 reports that, during the session, the client CPU utilization is at 50%, the desktop is being displayed on client 102 in full screen, client 102 is plugged in and a user is present, and if server operating system service 220 detects that, during the session, the VM's CPU utilization is at 40% and the underlying physical machine's CPU utilization is at 75%, policy 222 would dictate that, during the session, HTML5 media offloading should not be performed, H264 media redirection should be performed, real-time audio-video (RTAV) or real-time media engine (RTME) should be performed and the stream resolution throttle percentage should be 0%.

As can be seen, a policy may define many different combinations of values for the applicable client and server resource information and corresponding combinations of values for configuration settings that, when applied while the session is experiencing the respective resource utilization, should optimize the user experience while accessing a desktop. By leveraging machine learning backend 260 to process the client and server resource information compiled over a number of sessions, optimizer 250 can create and refine such policies dynamically.

Figure 4:
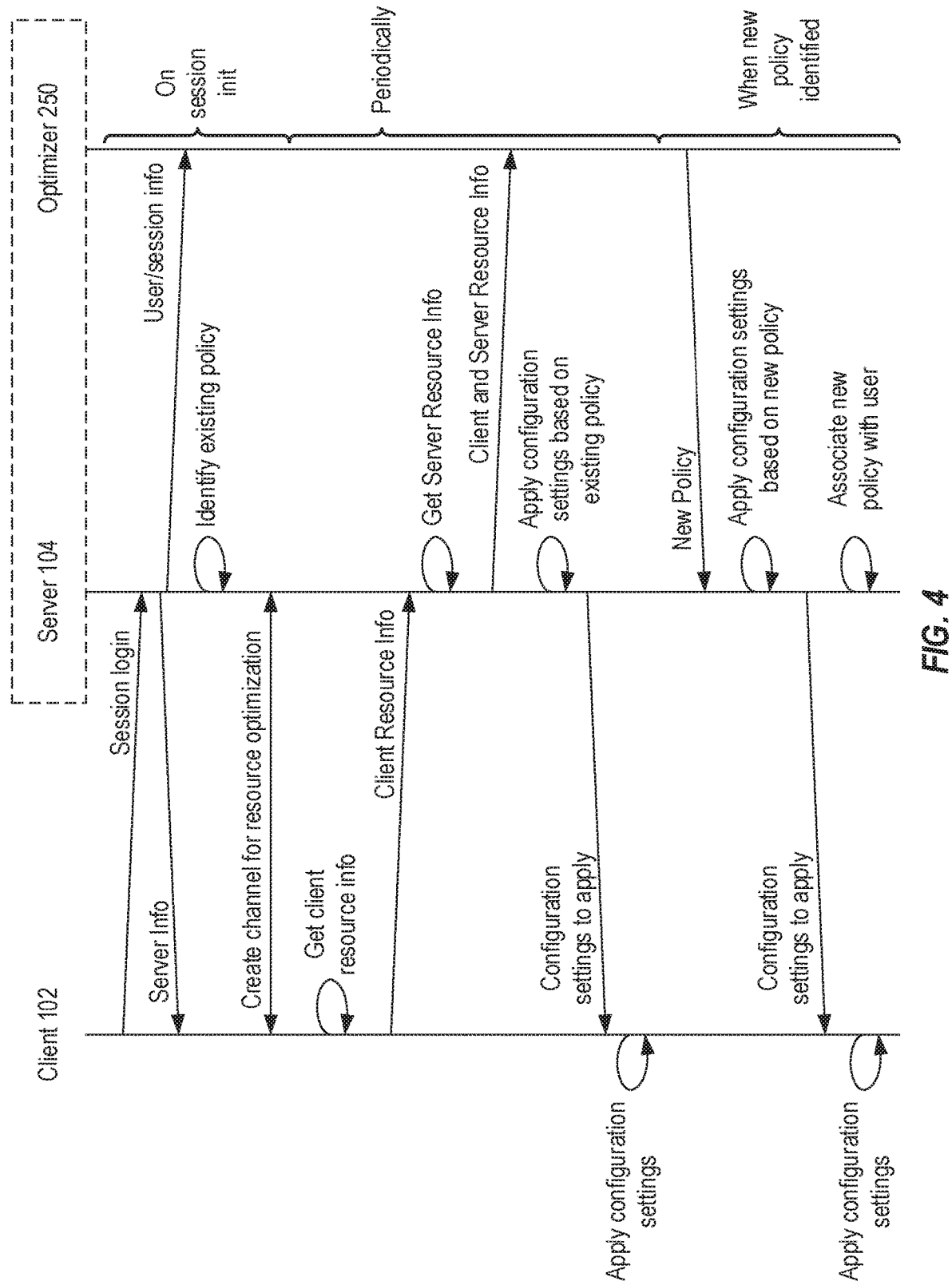
FIG. 4 provides a flowchart representing how configuration settings of a session can be dynamically optimized based on resource utilization during the session in accordance with some embodiments of the present invention.

FIG. 4 provides a flowchart representing functionality that can be performed on client 102 and server 104 to implement some embodiments of the present invention. This flowchart generally represents interactions that can be performed between client 102 and server 104 while a user of client 102 has established a session with server 104 for the purpose of accessing a desktop hosted on server 104.

As part of establishing a session on server 104, a user of client 102 can input credentials and any other necessary information to client engine 210. In response, client engine 210 can communicate with server 104 (or with a connection broker or other computing device/service) to establish the remote session. With the session established, server information can be sent back to client engine 210 to enable client engine 210 to access the desktop (e.g., the IP address, port, hostname, etc. for communicating with server engine 230 where the desktop is being hosted). In addition to these customary steps for establishing a session, client operating system service 200 can request the creation of a channel with server operating system service 220 for optimizing resource utilization during the session. As described above, in some embodiments, client operating system service 200 and server operating system service 220 can create a dynamic virtual channel for this purpose. FIG. 4 also shows that server operating system service 220 may share information about the user and/or the session with optimizer 250 as part of initializing the session. Optimizer 250 may use such information in conjunction with analyzing client and server resource information that it receives during the session.

In conjunction with creating this channel for optimizing resource utilization during the session, server operating system service 220 may identify an existing policy that is applicable to the session. For example, server operating system service 220 could determine whether a policy has been associated with the user's account (e.g., with the user's Active Directory account).

After identifying an existing policy, server operating system service 220 may analyze the existing policy to determine whether a set of configuration settings defined in the existing policy should be applied during the session. For example, FIG. 4 shows that client operating system service 200 can periodically obtain the client resource information and send it to server operating system service 220 via the channel. In response to (or at least in conjunction with) receiving the client resource information, server operating system service 220 can obtain server resource information. In some instances, after obtaining both the client and the server resource information, server operating system service 220 may share this information with optimizer 250 to enable optimizer 250 to dynamically create and/or refine a policy applicable to the session. Accordingly, during a session, optimizer 250 may repeatedly receive client and server resource information representing how the session is currently utilizing resources on client 102 and server 104.

Whether or not server operating system service 220 shares the current client and server resource information with optimizer 250, server operating system service 220 may apply the existing policy to the current client and server resource information. For example, server operating system service 220 may determine if the current client and server resource information matches any set of resource utilization information defined in policy 222, and if so, can retrieve the set of configuration settings that are mapped to the matching set of resource utilization information. Server operating system service 220 can then apply the retrieved set of configuration settings on server 104 and share the retrieved set of configuration settings with client operating system service 200 for application of the configuration settings on client 102. In this way, server operating system service 104 can dynamically adjust the configuration settings of the session based on the current utilization of client resources 205 and server resources 225/physical resources 225a.

It is noted that, in some embodiments, server operating system service 220 could instead share policy 222 with client operating system service 200, and, in such cases, could share the server resource information to enable client operating system service 200 to identify and apply the appropriate configuration settings. Accordingly, embodiments of the present invention should encompass implementations where the described functionality is performed on either client 102 or server 104 to cause the configuration settings of a session to be dynamically adjusted based on current resource utilization.

As optimizer 250 receives the client and server resource information, it can process the client and server resource information to determine whether any new/updated mappings are applicable to the session. For example, optimizer 250 can utilize machine learning backend 260 to apply a machine learning model to the current client and server resource information. The application of the machine learning model to the current client and server resource information may identify a new/different set of configuration settings that may provide an optimized experience relative to one or more sets of configuration settings defined in an existing policy. In such a case, optimizer 250 may generate a new/updated policy that includes a mapping between the client and server resource information (or subset of such information) and the new/different set of configuration settings (possibly in addition to previously defined mappings). Optimizer 250 may then share the new/updated policy with server operating system service 220. Server operating system service 220 may then employ the new/updated policy to analyze subsequent client and server resource information (which as stated above would be periodically received/obtained). Server operating system service 220 (or optimizer 250) could also associate the new/updated policy with the user (or possibly with server 104, client 102, a workload, etc.) to ensure that the new/updated policy is applied during a subsequently established session.

In summary, embodiments of the present invention may collect client and server resource utilization during sessions and apply machine learning to create and adapt policies that define configuration settings for dynamically optimizing the sessions based on current resource utilization. Embodiments of the present invention therefore provide a way to intelligently manage resource utilization across the desktop virtualization environment, including dynamically optimizing sessions for a variety of use cases.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for intelligently managing resource utilization in a desktop virtualization environment, the method comprising:

while a client has established a session with a server to access a desktop hosted on the server, obtaining client resource information defining utilization of resources on the client during the session and server resource information defining utilization of resources on the server during the session;

evaluating the client resource information and the server resource information against a policy applicable to the session;

based on the evaluation, identifying a first set of configuration settings for optimizing utilization of the resources on the client and the resources on the server during the session that the client has established to access the desktop hosted on the server;

applying the first set of configuration settings on the client and the server to optimize utilization of the resources on the client and the resources on the server during the session that the client has established to access the desktop hosted on the server;

processing the client resource information and the server resource information to generate a new policy applicable to the session;

while the session is established, obtaining additional client resource information defining subsequent utilization of resources on the client during the session and additional server resource information defining subsequent utilization of resources on the server during the session;

evaluating the additional client resource information and the additional server resource information against the new policy;

based on the evaluation, identifying a second set of configuration settings for optimizing the session; and applying the second set of configuration settings on the client and the server to optimize the session.

2. The method of claim 1, wherein the policy defines multiple sets of configuration settings for optimizing utilization of the resources on the client and the resources on the server during the session, and wherein identifying the first set of configuration settings for optimizing utilization of the resources on the client and the resources on the server during the session comprises determining that the first set of configuration settings is mapped to at least a subset of the client resource information and the server resource information.

3. The method of claim 1, further comprising:
while the session is established, obtaining further client resource information and further server resource information;

evaluating the further client resource information and the further server resource information against the new policy;

based on the evaluation, identifying a third set of configuration settings for optimizing utilization of the resources on the client and the resources on the server during the session; and applying the third set of configuration settings on the client and the server to optimize utilization of the resources on the client and the resources on the server during the session.

4. The method of claim 1, wherein applying the first set of configuration settings on the client and the server to optimize utilization of the resources on the client and the resources on the server during the session comprises:
sending the first set of configuration settings to the client.

5. The method of claim 4, wherein the first set of configuration settings are sent to the client over a dynamic virtual channel.

6. The method of claim 5, wherein the client resource information is received at the server over the dynamic virtual channel.

7. The method of claim 1, wherein the policy applicable to the session comprises a policy associated with an account of a user of the client.

8. The method of claim 1, further comprising:
storing the client resource information and the server resource information.

9. The method of claim 8, wherein the client resource information and the server resource information are stored in conjunction with additional client resource information and additional server resource information obtained during the session.

10. The method of claim 8, wherein the client resource information and the server resource information are stored in conjunction with additional client resource information and additional server resource information obtained during other sessions.

11. The method of claim 10, wherein the session and the other sessions are one of:

established by the same user using different clients;
established by different users; or
employed to perform a common workload.

12. A method for intelligently managing resource utilization in a desktop virtualization environment, the method comprising:
while a client has established a session with a server to access a desktop hosted on the server, obtaining client resource information defining utilization of resources on the client during the session and server resource information defining utilization of resources on the server during the session;

evaluating the client resource information and the server resource information against a policy applicable to the session;

based on the evaluation, identifying a first set of configuration settings for optimizing the session;

applying the first set of configuration settings on the client and the server to optimize the session;

processing the client resource information and the server resource information to generate a new policy applicable to the session;

while the session is established, obtaining additional client resource information defining subsequent utilization of resources on the client during the session and additional server resource information defining subsequent utilization of resources on the server during the session;

evaluating the additional client resource information and the additional server resource information against the new policy;

based on the evaluation, identifying a second set of configuration settings for optimizing the session; and applying the second set of configuration settings on the client and the server to optimize the session.

13. The method of claim 12, wherein processing the client resource information and the server resource information comprises applying a machine learning model to the client resource information and the server resource information.

14. The method of claim 12, further comprising:
storing the new policy in association with an account of a user of the client.

15. One or more non-transitory computer storage media storing computer executable instructions which when executed in a desktop virtualization environment implement a method for optimizing a session between a client and a server for accessing a desktop on the server, the method comprising:
obtaining client resource information and server resource information during the session between the client and the server for accessing the desktop on the server;

accessing a policy to determine that the client resource information and the server resource information matches a first set of resource utilization information defined in the policy;

identifying a first set of configuration settings that are mapped to the first set of resource utilization information;

applying the first set of configuration settings on the client and the server to optimize utilization of resources on the client and utilization of resources on the server during the session;

processing the client resource information and the server resource information to generate a new policy applicable to the session;

while the session is established, obtaining additional client resource information defining subsequent utilization of resources on the client during the session and additional server resource information defining subsequent utilization of resources on the server during the session;

evaluating the additional client resource information and the additional server resource information against the new policy;

based on the evaluation, identifying a second set of configuration settings for optimizing the session; and applying the second set of configuration settings on the client and the server to optimize the session.

16. The computer storage media of claim 15, wherein the method further comprises:

Obtaining further client resource information and further server resource information during the session;

accessing the new policy to determine that the further client resource information and the further server resource information matches a third set of resource utilization information defined in the new policy;

identifying a third set of configuration settings that are mapped to the third set of resource utilization information; and applying the third set of configuration settings on the client and the server to optimize the session.

17. The computer storage media of claim 15, wherein the method further comprises:

processing the client resource information and the server resource information by applying a machine learning model to the client resource information and the server resource information;

based on the processing, creating the new policy to map the second set of resource utilization information to the second set of configuration settings, the second set of resource utilization information being based on the client resource information and the server resource information.

18. The computer storage media of claim 17, wherein the method further comprises:

obtaining further client resource information and further server resource information during the session;

accessing the new policy to determine that the further client resource information and the further server resource information matches a third set of resource utilization information defined in the new policy;

identifying a third set of configuration settings that are mapped to the third set of resource utilization information; and applying the third set of configuration settings on the client and the server to optimize the session.

19. The computer storage media of claim 15, wherein the method further comprises:

processing the client resource information and the server resource information to generate a new policy applicable to the session;

while the session is established, obtaining additional client resource information defining subsequent utilization of resources on the client during the session and additional server resource information defining subsequent utilization of resources on the server during the session;

evaluating the additional client resource information and the additional server resource information against the new policy;

based on the evaluation, identifying a second set of configuration settings for optimizing the session; and applying the second set of configuration settings on the client and the server to optimize the session.

\* \* \* \* \*